Feb. 25, 1969   U. KRABBE ET AL   3,430,122
DRIVE SYSTEM FOR AN ASYNCHRONOUS ELECTRIC MOTOR
Filed April 15, 1966

INVENTORS
ULRIK KRABBE
HANS HEDSTRÖM
BY
Bailey, Stephens &
Huettig
ATTORNEYS

United States Patent Office 3,430,122
Patented Feb. 25, 1969

3,430,122
DRIVE SYSTEM FOR AN ASYNCHRONOUS ELECTRIC MOTOR
Ulrik Krabbe, Helsingor, Denmark, and Hans Hedstrom, Vasteras, Sweden, assignors to Allmänna Svenska Elektriska Aktiebolaget, Vasteras, Sweden, a corporation of Sweden
Filed Apr. 15, 1966, Ser. No. 542,782
U.S. Cl. 318—203                                      1 Claim
Int. Cl. H02p *1/40, 3/20, 5/28*

ABSTRACT OF THE DISCLOSURE

A three-phase asynchronous motor speed control system comprises an arrangement for expressing the difference between the motor speed and a reference magnitude, and controlled rectifiers for controlling the stator voltage depending on the numerical value of such magnitude. The phase sequence of the primary voltage is determined by a reversing switch dependent on the sign of such magnitude.

---

Figure 1:
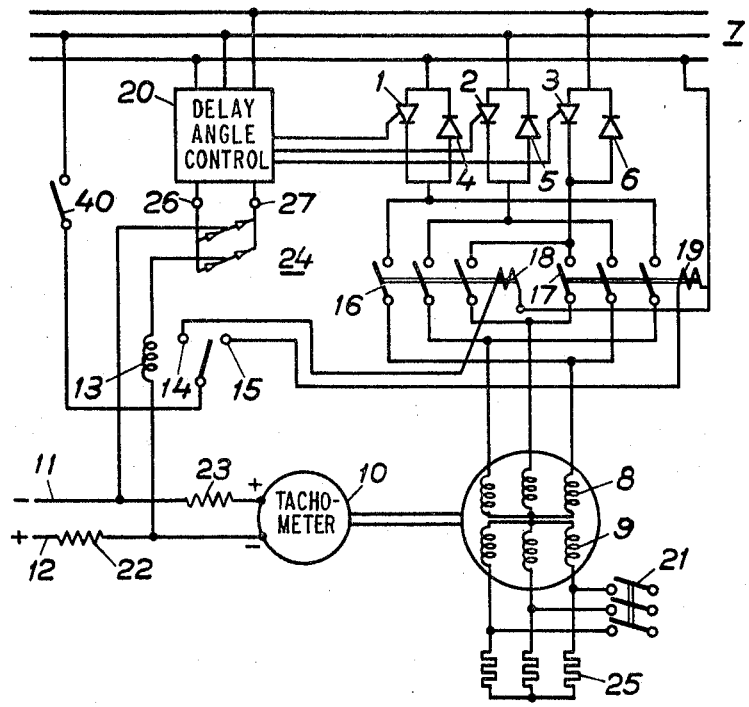

This invention relates to the speed control of an asynchronous electric motor by means of a controlled converter connected to the primary winding. The invention is particularly suitable for use with motors of lifting apparatus, for example crane motors, and, although the invention may be used for other applications, in the following description and claims it is described with reference to its use in connection with a lifting apparatus.

It is known that the speed of revolution of an asynchronous motor can be regulated by means of semiconductors connected between the feeding network and the primary terminals of the motor. By means of phase angle control of the semi-conductors, employing a delay angle control device, the primary voltage can be reduced and thereby the torque can be influenced. It is also known to make the output of the control device dependent on the difference between a reference quantity and a signal which represents the speed of revolution of the motor, so that automatic regulation of the speed of revolution can be achieved, which means that the torque of the motor is adapted to the motor load and the deviation from a set speed of revolution is determined principally by the characteristic of the control device.

The known device has the disadvantage that the motor cannot give a negative torque, that is that the speed of revolution of the motor cannot be kept constant if the load drives the motor. Consequently, the known device cannot be used in its simple form for lifting apparatus, since, during lowering of a load, the load drives the motor and the latter cannot effect a braking torque below synchronism.

It is also known that dynamic braking can be obtained with asynchronous motors by reversing the phase sequence. Such a braking is normally carried out by reversing the phase sequence of the primary winding of the motor at the instant when a braking torque is desired. The size of the braking torque is normally regulated by connecting a suitable resistor to the secondary winding of the motor.

The disadvantage with the previously known regulating systems employing reversed phase sequence is above all the fact that a lifting apparatus with such a regulating system is rather complicated and troublesome, from the operator's point of view. Let it be assumed, for example, that an order for the lowering of a crane is given by means of the control equipment. If there is a load on the crane hook, this involves the giving of an order for dynamic braking, since the motor would otherwise run away when the mechanical brake is released. If, on the contrary, there is no load on the crane hook, an order for driving must be given to the motor, and, if there is a small load on the hook, an order for driving followed by an order for dynamic braking must be given.

The reason why the manual operation is so complicated is first and foremost that the known tachometer control described above only gives continuous regulation in part of the working range of the crane.

The present invention provides a driving system for an asynchronous motor in which these disadvantages have been eliminated. With very small increased costs it has been possible to effect a continuous regulation of the motor speed in such a way that the function of driving as well as the function of braking is included in one single closed regulating system. The two functions are carried out by means of one and the same static converter and are controlled by the same delay angle control device. An even and jerk-free movement is considered to be of great importance in lifting apparatus, since it is essential to avoid a swaying of the load. In a driving system according to the invention the fact that the functions of the sequence reversing contactors are co-ordinated with the delay angle control of the converter contributes substantially to a jerk-free movement.

According to the invention a driving system comprising an n-phase asynchronous electric motor with its stator winding connectible to a feeding network through a controlled phase sequence reversing device and an n-phase converter series-connected with the reversing device, a transducer arranged to express the speed of revolution of the motor in the form of an output quantity, and a delay angle control device with its output side connected to said controlled converter, is characterised in that a reference quantity is compared with said output quantity so that a difference quantity is expressed, and that said delay angle control device is supplied with the numerical value of said difference quantity on its input side, while an active element is arranged to control said phase sequence reversing device in dependence on the polarity of said difference quantity in such a way that a change of polarity causes a reversal of the phase sequence.

Figure 2:
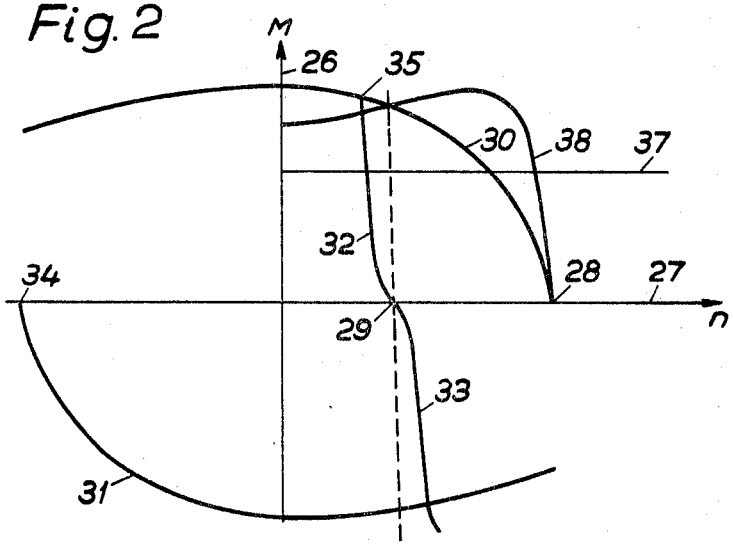

The invention will now be described in greater detail, by way of example, with reference to the accompanying drawing, in which:

FIGURE 1 is a circuit diagram of a driving system according to the invention, and FIGURE 2 shows torque curves for the driving system and the asynchronous motor thereof.

FIGURE 1 shows three controlled semi-conductors 1, 2, 3, and three diodes 4, 5 and 6, which are connected to a 3-phase voltage network 7. The semi-conductors are delay angle controlled by a delay angle control device 20 of conventional construction, which is also fed from the network 7. The input current of the control device 20 is fed into the terminals 26 and 27 of the device and the delay angle is made dependent on the input current in such a way that, when the input current is zero, little or no current is let through the semi-conductors. Increased control current reduces the delay angle of the semi-conductors 1, 2, 3 so that increased primary voltage is achieved in the motor and thereby also increased torque.

The primary winding of the asynchronous motor is designated by 8 and its secondary winding by 9. The latter is connected to an external resistor 25 which can be short-circuited by a contactor 21. A connection device is provided for reversing the phase sequence of the primary winding, this connection device consisting of contactors 16, 17, with contactor coils 18, 19. A direct current tachometer 10, mechanically connected to the rotor of the asynchronous motor and series-connected with a resistor 23, constitutes a signal transducer expressing the speed of the asynchronous motor. The reference quantity is given by a direct voltage source connected across busbars 11 and 12 and series-connected with a resistor 22. The difference between the signal expressing the speed and the reference quantity is thus a current which flows through the coil 13 of a polarised relay, comprising contacts 14 and 15, and a rectifier 24. The reference numeral 40 designates a control contact.

In FIGURE 2, which shows the mutual relation between torque M and speed of revolution, $n$ designates the axis for the speed of revolution and $m$ designates the axis for the torque. The line 37 indicates the magnitude of the normal torque of the motor. The point 28 corresponds to the forward synchronous speed of the motor and the point 34 to its synchronous speed during reversing. The numerals 30 and 31 designate the torque-speed curves at full voltage for forward and reverse running, respectively, in both cases with the resistor 25 connected to the secondary winding 9 of the motor. The numeral 38 designates the torque/speed curve of the motor at full voltage and with the resistor 25 short-circuited by the contactor 21. The point 29 corresponds to exact balance between a certain reference value and the tachometer signal. The numerals 32 and 33 designate the torque/speed curves which are achieved with the device when the motor is driving and braking, respectively.

The operation of the above described system will now be described, it being assumed that the motor is the hoisting motor of a crane, that the motor is not running, and that there is a load on the crane hook. A command for lowering the load is given by closing the contact 40. The desired lowering speed is determined by choosing the reference voltage supplied to the points 11, 12 and/or the resistance of the resistors. When the lowering command is given, the tachometer generator 10 does not give any voltage and current flows from the reference voltage source through the relay coil 13. Under these conditions the movable contact of the relay is connected to the relay contact 15. Current is thus supplied to the coil 19 so that the contactor 17 is closed. The current from the reference voltage source also flows to the delay angle control device, 20, so that ignition of the semi-conductors 1, 2, 3, occurs, that is, the motor has a full driving torque provided that the contactor 21 remains open. The torque of the motor, aided by the crane load, then accelerates the motor. When the speed of revolution of the motor has reached the point 35, the output voltage of the tachometer generator 10 has increased so much that the input current to the terminals 26, 27 is reduced to a sufficiently low value for producing a delay angle and the semi-conductors begin to reduce the motor voltage. The motor torque curve then follows the curve 32. Assuming that the motor voltage is proportional to the control current of the control device, the curve 32 will be a parabola, as the torque of the asynchronous motor is proportional to the square of the voltage, but the shape of the curve 32 is additionally influenced in different ways by the construction of the control device. When the speed of revolution has reached the value corresponding to the point 29, the motor voltage is zero. A further increase in speed of the motor effected by the load causes the difference current supplied to the rectifier 24 to change its direction, so that contactor 16 is closed and contactor 17 is opened. At the same time the control device increases the voltage of the motor, so that a braking torque occurs in the motor. The relationship between the speed and torque of the motor is now expressed by the curve 33, and the speed increases until balance is obtained between the driving torque of the load and the braking torque, which occurs at a speed slightly different from that desired, the desired speed of revolution being determined by the setting of the reference quantity and represented by a dotted line in FIGURE 2.

When, for example, a decrease of the speed is desired after a certain lowering movement, this is obtained by means of a corresponding alteration of the reference quantity.

In a similar way it is possible during lifting to give a sudden command for speed reduction and then automatically obtain the necessary braking with subsequent low-speed driving.

The desired direction rotation is set in a conventional way—that is by mutual changing of the contactors 16 and 17. At the same time a similar change of the terminals of the tachometer generator 10 must be undertaken.

From the above description, it is evident that the operator only has to give a command for a desired speed, and that this speed is obtained with a certain tolerance, mainly depending on the amplifying properties of the control equipment. It is not necessary to consider whether the load is braking or driving or whether a braking or driving motor action is desired.

A driving system according to the invention has the following advantages: The operation is very simple. The same semi-conductor equipment is used for regulating the driving and the braking, the equipment thus being inexpensive and simple. The reversing between driving and braking takes place at low or zero current so that wear of the contactors is small. These advantages are achieved by controlling the delay angle in dependence on the numerical value of the difference between a tachometer signal and a reference quantity, while at the same time the contactors reverse the phase sequence in dependence on the sign of the difference between the tachometer signal and the reference quantity.

The invention is not, of course, limited to the particular system described with reference to the drawing. For example, the polarised relay can be replaced by transistors or other static elements, and the reference quantity can be derived in a known way from passive reference elements, for example Zener diodes. The tachometer generator can be replaced by any suitable device which reproduces the speed of revolution of the motor.

As regards the motor, a normal short-circuited motor will have a low power factor on the occasion of braking with reversed phase sequence, so that, when it is not a question of very small powers, it is preferable to use either double cage motors or slip motors with external secondary resistance. Since this resistance reduces the speed of revolution at the rated torque, the contactor 21 can be used for short-circuiting the resistor 25 when the highest speed of revolution is desired. It may be advantageous to make the operation of the contactor 21 automatic and controlled by the tachometer voltage or by the primary current of the motor.

We claim:
1. A driving system comprising a three phase asynchronous electric motor with a stator winding, a three phase feeding network, an electromagnetically controlled three phase sequence reversing device with several pairs of cooperating contact members, a three phase delay angle controlled current varying device comprising a group of antiparallel-connected rectifiers interposed in each phase and a pair of input terminals for simultaneous electrical control of said groups, said groups being connected be- tween the network and corresponding stator winding terminals by means of said reversing device, said driving system further comprising transducer means to express the motor speed in the form of an output quantity, means to supply a reference quantity, means to compare the reference quantity with said output quantity to form a difference quantity, means to supply the numerical value of said difference quantity to said input terminals, and means to control said phase sequence reversing device in dependence on the sign of said difference quantity to produce a phase sequence reversal with each sign change.

References Cited

UNITED STATES PATENTS 3,076,126  1/1963  Schurr et al. _____ 318—207
3,181,046  4/1965  Sutton _____ 318—207 XR ORIS L. RADER, *Primary Examiner.*

GENE RUBINSON, *Assistant Examiner.*